(12) United States Patent
McIntyre (10) Patent No.: US 7,024,045 B2
(45) Date of Patent: Apr. 4, 2006

(54) DYNAMIC BANDWIDTH ADAPTIVE IMAGE COMPRESSION/DECOMPRESSION SCHEME

(75) Inventor: Kristen A. McIntyre, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 583 days.

(21) Appl. No.: 09/934,776

(22) Filed: Aug. 21, 2001

(65) Prior Publication Data

US 2003/0039398 A1 Feb. 27, 2003

(51) Int. Cl.
*G06K 9/36* (2006.01)
*G06F 15/16* (2006.01)

(52) U.S. Cl. .................. 382/239; 382/240; 709/233
(58) Field of Classification Search ............ 382/239, 382/232, 240, 254; 709/246, 267, 235, 233–232, 709/230; 370/229
See application file for complete search history.

(56) References Cited

U.S. PATENT DOCUMENTS

| | | | | |
|---|---|---|---|---|
| 5,764,807 A * | 6/1998 | Pearlman et al. | ............ | 382/240 |
| 5,991,458 A * | 11/1999 | Kunitake et al. | ............ | 382/254 |
| 6,031,939 A * | 2/2000 | Gilbert et al. | ............ | 382/239 |
| 6,195,388 B1 * | 2/2001 | Choi et al. | ............ | 375/240.05 |
| 6,442,603 B1 * | 8/2002 | Borella | ............ | 709/218 |
| 6,529,631 B1 * | 3/2003 | Peterson et al. | ............ | 382/232 |
| 6,567,117 B1 * | 5/2003 | Nago et al. | ............ | 348/180 |
| 6,779,040 B1 * | 8/2004 | Lee et al. | ............ | 709/247 |
| 2002/0021753 A1 * | 2/2002 | Igi et al. | ............ | 375/240.01 |
| 2002/0181408 A1 * | 12/2002 | Sirivara et al. | ............ | 370/252 |

\* cited by examiner

*Primary Examiner*—Wenpeng Chen
(74) *Attorney, Agent, or Firm*—Gunnison, McKay & Hodgson, L.L.P.; Philip J. McKay (57) ABSTRACT

The present invention provides a method and apparatus for a bandwidth adaptive image compression/decompression scheme. In one embodiment, the present invention uses a special protocol between the sender and the receiver to measure the latency of the connection. This protocol and its result are sent and received at an interval based on a dynamic feedback loop algorithm. Based on the results of the protocol, a compression scheme is chosen. This scheme uses CPU time conservatively, and also transmits the most interesting data first. In another embodiment, the present invention throws away data that is repetitious, especially when the connection is down for a short period of time. In yet another embodiment of the present invention, measurements are taken for the perceptual degradation of the image for various compression schemes, and the results are supplemented with the results of the protocol to choose a viable compression/decompression scheme.

12 Claims, 6 Drawing Sheets

| Name |
|---|
| • 2-D Run-length lossess encoding scheme |
| • YUV chroma sub-sampling (4-2-2, 4-H) |
| • Adaptive pulse code modulation |
| • Straight RGB (24 bit) |
| • Discrete Cosine Transform |
| • Wavelet Transform |

DYNAMIC BANDWIDTH ADAPTIVE IMAGE COMPRESSION/DECOMPRESSION SCHEME

BACKGROUND OF THE INVENTION

1. Field of the Invention

The present invention relates primarily to the field of software, and in particular to a method and apparatus for a dynamic bandwidth adaptive image compression and de-compression scheme.

Portions of the disclosure of this patent document contains material that is subject to copyright protection. The copyright owner has no objection to the facsimile reproduction by anyone of the patent document or the patent disclosure as it appears in the Patent and Trademark Office file or records, but otherwise reserves all rights whatsoever.

2. Background Art

Computers are often used to process, play back, and display data, especially data that contains images, and is commonly termed as video data. This video data may come from sources such as storage devices, on-line services, VCRs, cable systems, broadcast television tuners, etc. Video data is memory intensive, that is, video data requires large amounts of memory for storage and use by a computer system. CD-ROMs or DVD-ROMs provide one solution to the problem of storing large amounts of data. However, even the storage capabilities of a CD-ROM or a DVD-ROM can be exceeded when storing motion picture length video data.

To reduce the transmission bandwidth and memory requirements when working with video data, various compression schemes have been developed so that less storage space is needed to store video information and a smaller bandwidth is needed to transmit it. Prior art video compression schemes include Motion JPEG, MPEG-4, QuickTime, etc.

Compression

Compression is a scheme for reducing the amount of information required to represent data, and is mainly applied to data that contains images, sounds, and graphics, or to files that are too large. Data compression schemes are used, for example, to reduce the size of a data file so that it can be stored in a smaller memory space. Data compression schemes may also be used to compress data prior to its transmission from one site to another, reducing the amount of time required to transmit the data. This second reason is adopted in packet switched networks like the Internet where bandwidth is limited.

To access the compressed data, it is first decompressed into its original form. A compressor/de-compressor, commonly known as a codec, is typically used to perform the compression and decompression of data. Some common codecs are the 2D Run Length Encoding scheme, Entropy Encoding scheme (which covers compression schemes like gzip and LZW, etc.), and Discrete Cosine Transform (DCT). One measure of the performance or efficiency of a codec is its "compression ratio". Compression ratio refers to the ratio of the number of bits of uncompressed data to the number of bits of compressed data. Compression ratios may be 2:1, 3:1, etc.

Data compression may also be required when the input/output rate of a particular data receiver is less than the data rate of the transmitted data. This can occur when providing video data to computer systems. Video data of frame size 320 times 240 (320×240) is provided at rates approaching 7 megabytes per second. This rate is greater than the rate of commonly used I/O subsystems of personal computers. Some approximate representative rates of common I/O subsystems found on personal computers are:

| | |
|---|---|
| Serial Communications: | 1–2 kilobytes/sec |
| ISDN: | 8–16 kilobytes/sec |
| Ethernet: | 1–10 megabytes/sec |
| CD-ROM: | 0.15–4.8 megabytes/sec |
| SCSI Disk: | 0.5–40 megabytes/sec |

Another measure of video codec compression ratio is the average compressed bits-per-pixel. This measure is useful in describing video compression because different conventions are used for calculating the size of uncompressed video, i.e., some use 24 bits-per-pixel RGB (Red-Green-Blue), and others use 4:2:2 sub-sampled 16 bits-per-pixel YUV (Yellow under Violet). The averaging accounts for potentially different strategies employed for frames in a sequence. The bandwidth requirements for a sequence of frames is calculated by multiplying the average compressed bits-per-pixel and the number of frames per second, and dividing the resulting product by the number of pixels in each encoded frame.

Limitations of Compression Schemes and Algorithms

There are two types of conventional compression schemes: lossy (irreversible) and lossless (reversible). Lossless compression schemes, also called coding schemes, compress and decompress each image frame without the loss of any pixel data. In other words, the image frame can be decompressed without degrading the visual quality of the image. Lossless compression schemes are those for which the coding algorithms yield decompressed images identical to the original digitized images. These schemes, in general, are required in applications where the pictures are subjected to further processing, e.g. for the purpose of extraction of specific information. Lossy schemes, in contrast, suffer a loss of image information and result in a decrease in the quality of the image on decompression (image reproduction).

Certain conventional lossy image compression schemes achieve either better reproduction quality or better compression ratios on images having certain visual attributes. For example, one lossy compression scheme, the vector quantization scheme, works best when images have limited color palettes, or have regions with limited color palettes. Another lossy compression scheme, motion compensation compression, achieves better compression ratios and reproduction quality when portions of the image on a frame are translated portions of a previous frame.

Thus, some portions of a video frame have visual attributes that are better suited for one type of lossy compression as compared to another. Therefore, if a single compression scheme is applied to each image frame in a video, some portions of the image may have a degraded reproduction quality as compared to other portions better suited to the applied compression scheme.

Nearly all video compression schemes are lossy, i.e., information is inevitably discarded in the compression process. A measure of quality is how much of this lost information is noticed by a human observer. However, there is not a consistent, objective model of human perception that can be applied. A simple, concrete, quality metric that is frequently used is the Mean-Squared-Error (MSE) that measures the error on a per-pixel basis from the uncompressed original.

Most lossy compression schemes are designed for the human visual system and may destroy some of the information required during processing. Thus, images from digital radiology in medicine or from satellites in space are usually compressed by reversible methods. Lossless compression is generally the choice also for images obtained at great cost, for which it may be unwise to discard any information that later may be found to be necessary, or in applications where the desired quality of the rendered image is unknown at the time of acquisition, as may be the case in digital photography. In addition, lossless may be preferred over lossy in applications where intensive editing or repeated compression/decompression is required: the accumulation of error due to a lossy iteration may become unacceptable.

Most compression algorithms are computationally complex, which limit their application since very complex algorithms often require expensive hardware to assist in the compression. A useful number to measure computational complexity of software-based compression algorithms is MIPS per megapixel/sec, i.e., essentially instructions/pixel. For example, an algorithm just capable of compressing 320×240 pixels per frame at 30 frames per second on a 40 MIPS machine has a computational complexity of 40,000,000 (320×240×30)/congruent 17 instructions/pixel.

It is desirable to use a compression and decompression scheme which yields a homogeneous image after decompression. A homogeneous image is one having a consistent reproduction quality across the image. When an image is not homogeneous, the areas that have a particularly degraded reproduction quality attract an observer's attention more readily than the better reproduced areas. Thus, there is a need for an efficient image compression system and method that will compress images and produce a homogeneous effect across each frame on decompression.

Another disadvantage of existing prior art compression schemes is their inability to provide adequate quality of playback in terms of format (spatial resolution), frame rate (temporal resolution) and color fidelity. In addition, existing prior art schemes do not adequately compensate for the low data output rate of CD-ROMs or DVD-ROMs.

With respect to spatial resolution, many prior art schemes do not provide a "full screen" of video output. Here, full screen is defined as 640×480 color pixels. Many prior art compression schemes provide a small "box" that displays video data. Such small displays are difficult to view, and do not provide adequate playback of video data. With respect to temporal resolution, many of the prior art schemes provide "choppy" playback of video data, with jerky motion, and pauses in playback while new frame data is being generated.

Many source images include high resolution color information. For example, the source image may have a color resolution of 15, 24, or 32 bits per pixel. Many computer systems are only capable of providing 8 bit per pixel color output. This requires that the large number of colors of the source image be mapped to a smaller number of colors that can be displayed by the computer system. This step involves the use of a color look-up table (LUT). Prior art compression schemes typically rely on the host computer system to provide a color LUT. These color LUTs are generally not optimized for the particular source image, resulting in unsatisfactory color display.

Another disadvantage of prior art compression schemes is that they are either "symmetrical" or "asymmetrical". Symmetry refers to the ratio of the computational complexity of compression to that of decompression. Codecs are frequently designed with a greater computational load on the compressor than the de-compressor, i.e., they are asymmetric. While this may be a reasonable strategy for "create-once, play-many" video sequences, it limits the range of applications for the codec. Asymmetric compression schemes are not suitable for teleconferencing, for example, since teleconferencing requires essentially real-time processing and substantially equivalent compression and decompression rates. On the other hand, symmetrical compression schemes attempt to compress the data in the same time it takes to display the data. Typically, symmetrical compression schemes compress the data in a single pass, in real time, or as close to it as possible. This limits the performance of the scheme, especially on a network like the Internet, where not only the total number of users is unknown prior to the transfer of data, but that number constantly changes. If there are more users than the network can handle, the network can stall in order to accommodate the requests of all the users. This increases the time to transfer data and makes a symmetrical compression scheme undesirable.

Compression Scheme: Wavelet Transform

Sub-band encoding schemes like Wavelet Transform rely upon the representation that an image display signals for representing lower frequency regions of an image with stronger electrical power than those representing higher frequency regions. Since the lower frequency regions contain more visual information, a larger number of bits is assigned to represent the lower frequency regions. One advantage in using the Wavelet Transform scheme is that it almost eliminates 'blocking' because it does not apply itself to a predetermined number of image-blocks like some compression schemes. It rather applies to a contiguous image, which reduces the compression computational load. Another advantage of the Wavelet Transform is that in order to compress an image a portion of each block is assigned a predetermined number of bits based on the power of the CPU. Another advantage of using the Wavelet Transform is to use a discrete and orthogonal frequency filter of a predetermined characteristic. Using this filter, the scheme provides multi-resolution expressions and a zonally variable basis, which is yet another advantage of using the Wavelet Transform. In other words, as the scheme is recursively repeated, the resolution is reduced by half. In addition, the band dividing characteristic of the filters used in the scheme allows octave divisions.

Despite the above described advantages of using a Wavelet Transform compression scheme, the compression rate is desired for improvement especially for large image data. One reason for improvement is the increased use of computer graphics that can be easily downloaded or transferred via the packet switched network like the Internet. Even though prior art schemes, like Wavelets, adjust the compression factor dynamically to adjust to the available bandwidth, none of the prior art schemes use techniques whereby static sections of an image are compressed differently than dynamic sections, or use the least amount of CPU time to compress and de-compress the image. In other words, prior art schemes use a static approach to compress and de-compress an image, and this results in not only unnecessary use of CPU time, but also unacceptable delays to transmit the image over a network like the Internet.

SUMMARY OF THE INVENTION

A method and apparatus for a dynamic bandwidth adaptive image compression/de-compression scheme is described herein. In one embodiment, the present invention continually uses a special protocol between the sender and the receiver to determine the bandwidth latency of the connection. This message is sent at an interval to measure the latency, and is based on a dynamic feedback loop algorithm.

In one or more embodiments, depending upon the latency of the connection and the amount and type of data to be transmitted, the present invention decides to use either a lossy or a lossless compression scheme from a list of available compression schemes. In other words, the present invention is service side driven, and since the choice of scheme is based on the latency of the connection, it can be different for the same data and connection medium at a different time. The choice is also dependant on the scheme that uses a client CPU time conservatively, and is based on the average decay of latency and the clock speed of the client CPU. Furthermore, the choice is also dependent upon the amount of client information fed back to the scheme. In another embodiment, the present invention transmits the most interesting data first.

In another embodiment, the present invention throws away data that is repetitious or static when the connection is down for a short period of time. By discarding the repetitious and static data, the present invention does not continually update data, and this saves on CPU time on repaint and refresh. Alternately, measurements are taken by the CPU of the sender's machine, for example using heuristics, to calculate the perceptual degradation of the image for the various compression schemes. The results of the measurements are used as a supplementary feedback to help in deciding which dynamic compression scheme to choose from.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

A method and apparatus for a dynamic bandwidth adaptive image compression/de-compression scheme is described herein. In the following description, numerous specific details are set forth to provide a more thorough description of embodiments of the invention. It is apparent, however, to one skilled in the art, that the invention may be practiced without these specific details. In other instances, well known features, like the packet switching techniques of networks like the Internet, circuit failures in the network, router overload analysis, or analysis of the general moment to moment load of the network have not been described in detail so as not to obscure the invention.

When data is transmitted over a network connection, according to one embodiment, a protocol message is continually sent from the source to the destination to establish the latency of the connection. This protocol message is similar to ping programs used to search a particular entity on a network, and have very little overhead. One reason for having a low overhead is that this protocol has to bring the results of the latency to the source as quickly as possible. This protocol message is sent continually across the connection at a fixed pre-defined interval, and the results are sent continuously back to the source at the same fixed interval. This back and forth protocol message forms the basis of a dynamic feedback loop algorithm. Based on the results, there are a collection of compression schemes, like wavelet transform, from which one is chosen to compress the data before sending it to the destination.

One scheme uses this protocol by in-band piggybacking of the measurement instrumentation on top of the image data. By using this scheme, the overhead involved in sending this protocol is minimized. Another scheme uses the transmission control protocol (TCP) out-of-band signaling, which is architecturally preferred over the first scheme in certain situations.

Figure 1:
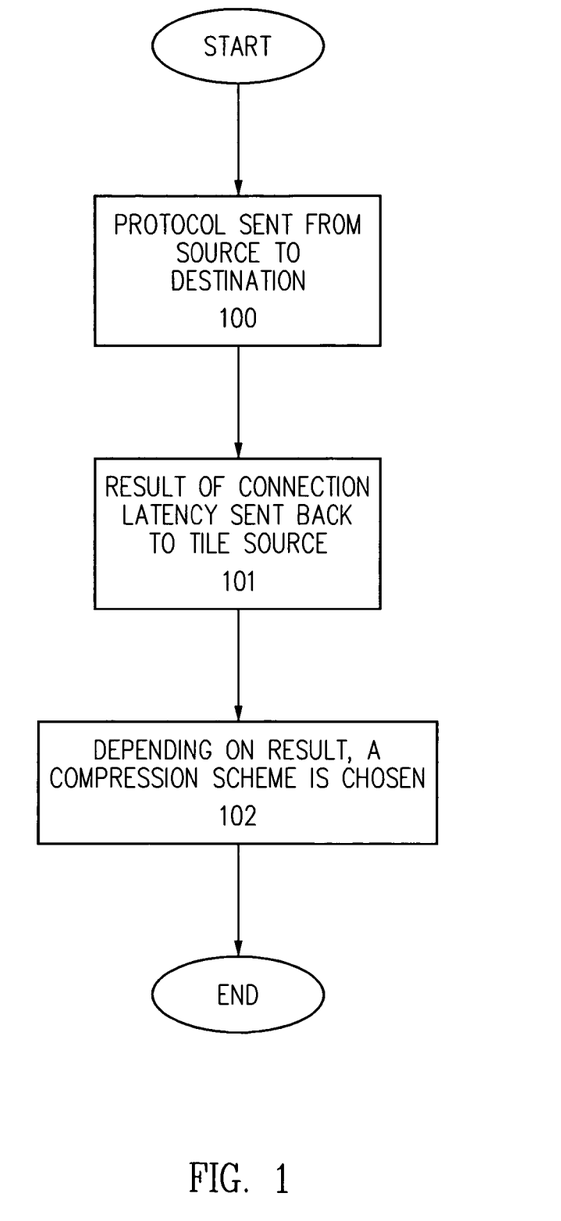
FIG. 1 is a flowchart that illustrates the use of the present invention.

The usage of the protocol is seen in FIG. 1, where at box 100 the protocol is sent from the source to the destination. Next, at box 101, the result of network latency is sent back to the sender. Finally, at box 102, based on the result of the protocol, one of the lossy compression scheme is chosen to transmit the data. These three steps are sequentially performed until all the data is successfully transmitted from the source to the destination.

Figure 2:
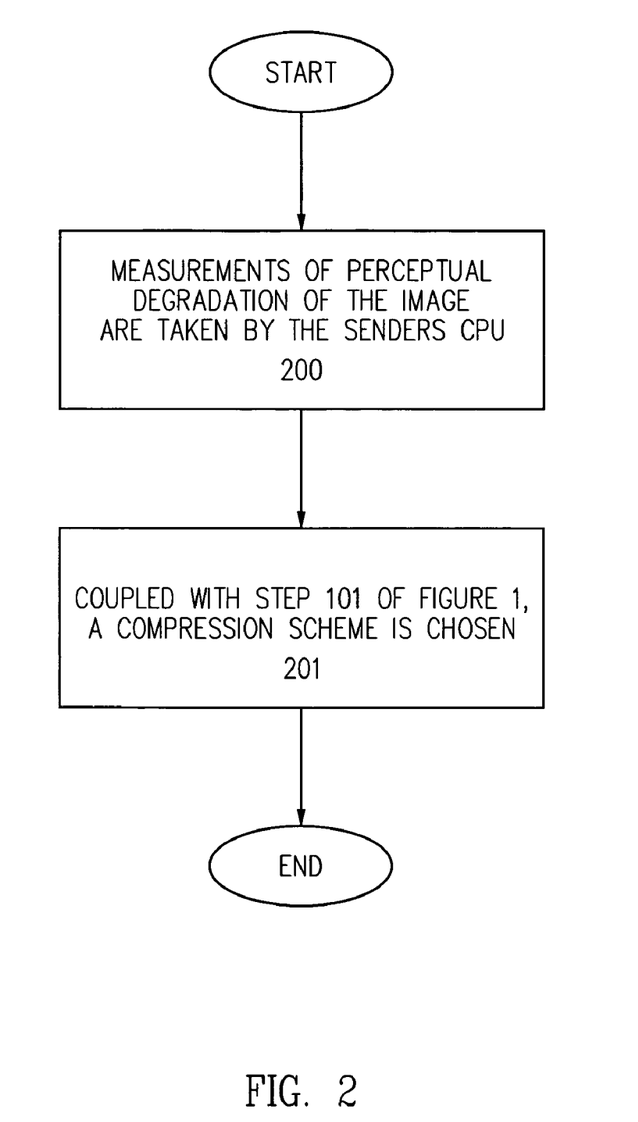
FIG. 2 is a flowchart illustrating an alternative approach to choosing a scheme, according to one embodiment of the present invention.

Simultaneously, according to another embodiment, the CPU of the sender's machine can take measurements of the perceptual degradation of the image using the various compression schemes available. The result of these measurements are supplemented with the result of the protocol message, and a suitable compression scheme is chosen. The chosen scheme further optimizes the network latency while keeping the image quality from not being discarded by the destination. This concurrent scheme is seen in FIG. 2, where at box 200 the measurements of a perceptual degradation of the image are taken by the CPU of the sender. Next, at box 201, the results of box 200 are coupled with the results obtained by the protocol message regarding the latency of the connection (box 101, in FIG. 1). This combined effort results in the choice of the best compression scheme.

Figure 3:
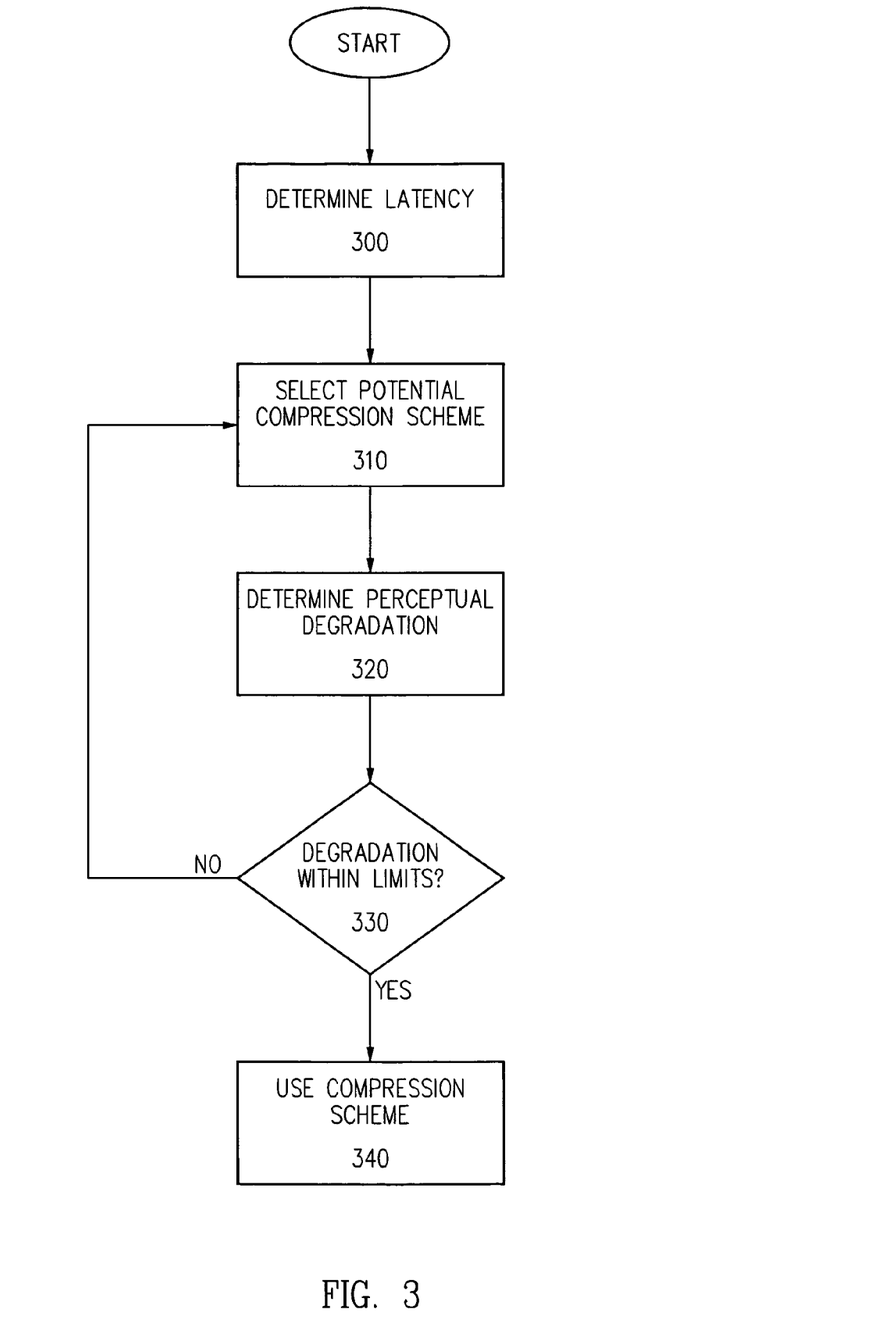
FIG. 3 is a flowchart illustrating an embodiment of the present invention.

FIG. 3 illustrates an embodiment of the present invention of using a compression scheme based on the latency and perceptual degradation of the image. At box 300, the latency of the connection between a sender and a receiver is determined. At box 310, a potential compression scheme is chosen based on the results of box 300 above. At box 320, the perceptual degradation of the image is calculated by the sender's CPU. At box 330, a check is made to see if the degradation is within permissible limits of the potential compression scheme chosen at box 310 above. If it is, then at box 340, the chosen compression scheme is used. On the other hand, if the degradation is not within permissible limits of the potential compression scheme, then another scheme is chosen at box 310, and the process continues.

Figure 4:
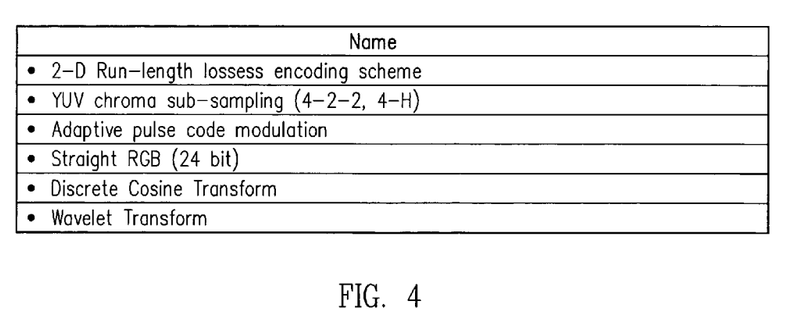
FIG. 4 is a table of the compression schemes based on the results of the protocol of the present invention.

FIG. 4 is a table showing a partial list of compression schemes that can be chosen based on the latency of the connection between a sender and a receiver. Some of the compression schemes mentioned in the partial list include a two dimensional run-length lossless encoding scheme, a YUV chroma sub-sampling scheme, an adaptive pulse code modulation scheme, a straight RGB 24-bit scheme, a discrete cosine transform scheme, and a wavelet transform scheme. It must be noted here that the list is by no means limiting to the schemes mentioned. Since the present invention can be used to transfer all kinds of data, and can be used over known connection methods, there may be compression schemes not mentioned in the above table that may be suitable for certain kinds of data or connection methods.

Static Data

There are many occasions when a static piece of data is continuously repeated. For example, banner advertisements on a web page, copyright information on a web page, or help contents in a web page or application program. Since these pieces of information do not change, according to one embodiment the present invention, these pieces of information are not repainted continuously, which saves on CPU time. This time saving concept is especially realized when the network connection is overloaded with users and stalls to respond to user requests. The connection is termed to be "down" when that happens, and repainting areas of a web page, for example, that have static information on it only increases the down time. An increase in the down time equates to lower transmittal rates, or higher latency of the connection, and a goal of the present invention is to keep transmittal time to a minimum.

Figure 5:
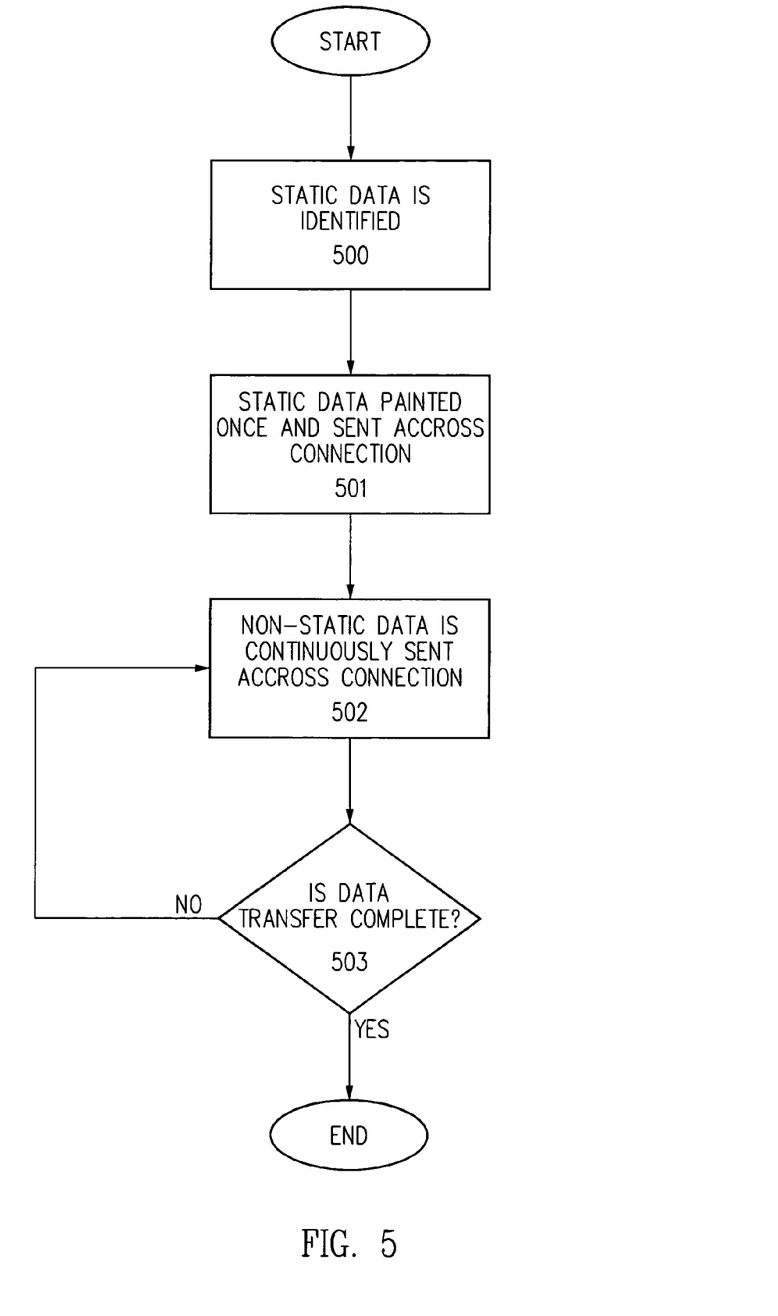
FIG. 5 is a flowchart illustrating an embodiment of the present invention.

FIG. 5 illustrates how this static data is identified and not repainted continuously thus saving on CPU time. At box 500 static data is identified. At box 501, this data is painted once and sent across the connection line. At box 502, non-static data is sent across the connection. If at box 503, the data transfer is not complete, then non-static data is continuously sent across until all data is transferred.

Embodiment of a Computer Execution Environment

Figure 6:
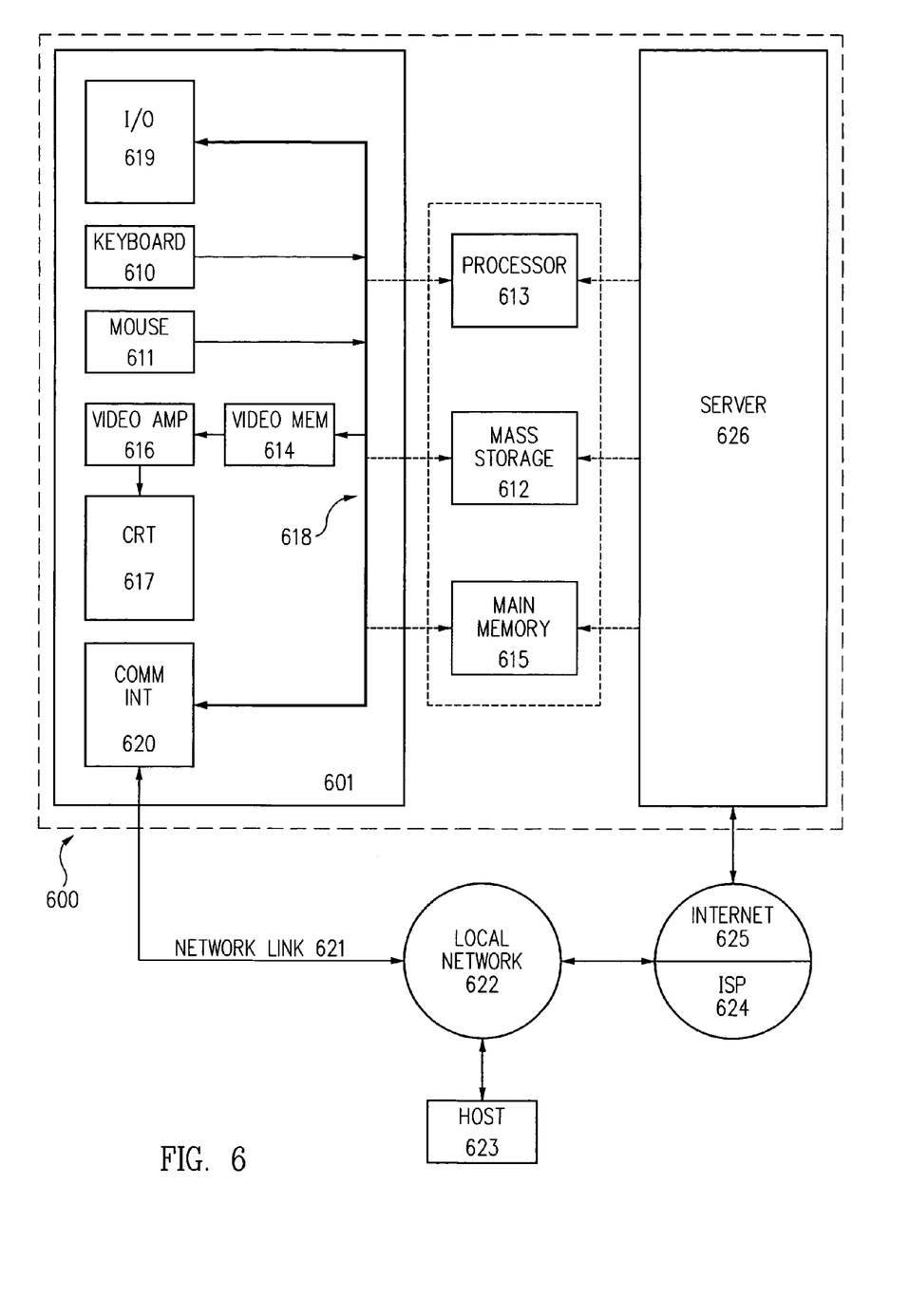
FIG. 6 is a illustration of a computer environment.

An embodiment of the invention can be implemented as computer software in the form of computer readable code executed in a desktop general purpose computing environment such as environment 600 illustrated in FIG. 6, or in the form of bytecode class files running in such an environment. A keyboard 610 and mouse 611 are coupled to a bi-directional system bus 618. The keyboard and mouse are for introducing user input to a computer 601 and communicating that user input to processor 613.

Computer 601 may also include a communication interface 620 coupled to bus 618. Communication interface 620 provides a two-way data communication coupling via a network link 621 to a local network 622. For example, if communication interface 620 is an integrated services digital network (ISDN) card or a modem, communication interface 620 provides a data communication connection to the corresponding type of telephone line, which comprises part of network link 621. If communication interface 620 is a local area network (LAN) card, communication interface 620 provides a data communication connection via network link 621 to a compatible LAN. Wireless links are also possible. In any such implementation, communication interface 620 sends and receives electrical, electromagnetic or optical signals, which carry digital data streams representing various types of information.

Network link 621 typically provides data communication through one or more networks to other data devices. For example, network link 621 may provide a connection through local network 622 to local server computer 623 or to data equipment operated by ISP 624. ISP 624 in turn provides data communication services through the world wide packet data communication network now commonly referred to as the "Internet" 625. Local network 622 and Internet 625 both use electrical, electromagnetic or optical signals, which carry digital data streams. The signals through the various networks and the signals on network link 621 and through communication interface 620, which carry the digital data to and from computer 600, are exemplary forms of carrier waves transporting the information.

Processor 613 may reside wholly on client computer 601 or wholly on server 626 or processor 613 may have its computational power distributed between computer 601 and server 626. In the case where processor 613 resides wholly on server 626, the results of the computations performed by processor 613 are transmitted to computer 601 via Internet 625, Internet Service Provider (ISP) 624, local network 622 and communication interface 620. In this way, computer 601 is able to display the results of the computation to a user in the form of output. Other suitable input devices may be used in addition to, or in place of, the mouse 611 and keyboard 610. I/O (input/output) unit 619 coupled to bi-directional system bus 618 represents such I/O elements as a printer, A/V (audio/video) I/O, etc.

Computer 601 includes a video memory 614, main memory 615 and mass storage 612, all coupled to bi-directional system bus 618 along with keyboard 610, mouse 611 and processor 613.

As with processor 613, in various computing environments, main memory 615 and mass storage 612, can reside wholly on server 626 or computer 601, or they may be distributed between the two. Examples of systems where processor 613, main memory 615, and mass storage 612 are distributed between computer 601 and server 626 include the thin-client computing architecture developed by Sun Microsystems, Inc., the palm pilot computing device, Internet ready cellular phones, and other Internet computing devices.

The mass storage 612 may include both fixed and removable media, such as magnetic, optical or magnetic optical storage systems or any other available mass storage technology. Bus 618 may contain, for example, thirty-two address lines for addressing video memory 614 or main memory 615. The system bus 618 also includes, for example, a 32-bit data bus for transferring data between and among the components, such as processor 613, main memory 615, video memory 614, and mass storage 612. Alternatively, multiplex data/address lines may be used instead of separate data and address lines.

In one embodiment of the invention, the processor 613 is a microprocessor manufactured by Motorola, such as the 680×0 processor or a microprocessor manufactured by Intel, such as the 80×86, or Pentium processor, or a SPARC microprocessor from Sun Microsystems, Inc. However, any other suitable microprocessor or microcomputer may be utilized. Main memory 615 is comprised of dynamic random access memory (DRAM). Video memory 614 is a dual-ported video random access memory. One port of the video memory 614 is coupled to video amplifier 616. The video amplifier 616 is used to drive the cathode ray tube (CRT) raster monitor 617. Video amplifier 616 is well known in the art and may be implemented by any suitable apparatus. This circuitry converts pixel data stored in video memory 614 to a raster signal suitable for use by monitor 617. Monitor 617 is a type of monitor suitable for displaying graphic images.

Computer 601 can send messages and receive data, including program code, through the network(s), network link 621, and communication interface 620. In the Internet example, remote server computer 626 might transmit a requested code for an application program through Internet 625, ISP 624, local network 622 and communication interface 620. The received code may be executed by processor 613 as it is received, and/or stored in mass storage 612, or other non-volatile storage for later execution. In this manner, computer 600 may obtain application code in the form of a carrier wave. Alternatively, remote server computer 626 may execute applications using processor 613, and utilize mass storage 612, and/or video memory 615. The results of the execution at server 626 are then transmitted through Internet 625, ISP 624, local network 622, and communication interface 620. In this example, computer 601 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method and apparatus for a dynamic bandwidth adaptive image compression/de-compression scheme is described in conjunction with one or more specific embodiments. The invention is defined by the following claims and their fill scope of equivalents.

The invention claimed is:

1. A method and apparatus for a bandwidth adaptive image compression/decompression scheme comprising:
   using a protocol between sender and receiver wherein said protocol calculates bandwidth latency of a connection;
   calculating a perceptual degradation of an image for various compression schemes; and
   choosing a compression scheme based on results of said protocol and results of said calculating the perceptual degradation of said image for various compression schemes.

2. The method of claim 1 wherein said using a protocol is done periodically.

3. The method of claim 1 wherein said using a protocol is based on a dynamic feedback loop.

4. The method of claim 1 wherein said choosing a compression scheme depends, in part, on said scheme that uses CPU time conservatively.

5. The method of claim 1 further comprising:
   transmitting the most interesting data first, wherein said transmitting is decided by a wavelet transform scheme.

6. The method of claim 1 further comprising:
   discarding repetitious data, wherein said discarding is done when said connection is down for a short period of time.

7. A computer program product comprising:
   a computer usable medium having computer readable program code embodied therein configured to create a bandwidth adaptive image compression/decompression scheme, said computer product comprising:
   computer readable code configured to cause a computer to use a protocol between sender and receiver wherein said protocol calculates bandwidth latency of a connection;
   computer readable code configured to cause a computer to calculate a perceptual degradation of an image for various compression schemes; and
   computer readable code configured to cause a computer to choose a compression scheme based on results of said protocol and results of said calculation of the perceptual degradation of said image for various compression schemes.

8. The computer program product of claim 7 wherein said computer readable code configured to cause a computer to use said protocol is configured to cause said computer to use said protocol periodically.

9. The computer program product of claim 7 wherein said computer readable code configured to cause a computer to use said protocol is configured to cause said computer to use said protocol based on a dynamic feedback loop.

10. The computer program product of claim 7 wherein said computer readable code configured to cause a computer to choose a compression scheme based on the results of said protocol is configured to cause said computer to choose a compression scheme, in part, depending on said scheme that uses the CPU time conservatively.

11. The computer program product of claim 7 wherein computer readable code is configured to cause a computer to transmit the most interesting data first determines said most interesting data by a wavelet transform scheme.

12. The computer program product of claim 7 wherein computer readable code is configured to cause a computer to discard repetitious data is configured to cause said computer to discard said repetitious data when said connection is down for a short period of time.

* * * * *